United States Patent [19]

Mori et al.

[11] 4,146,267
[45] Mar. 27, 1979

[54] ADJUSTING DEVICE FOR RECLINING SEAT

[75] Inventors: Mamoru Mori, Okazaki; Shigeharu Nakai, Toyota, both of Japan

[73] Assignee: Toyota Jidosha Kogyo Kabushiki Kaisha, Toyota, Japan

[21] Appl. No.: 838,303

[22] Filed: Sep. 30, 1977

[30] Foreign Application Priority Data

Nov. 1, 1976 [JP] Japan ............................ 51-146969[U]

[51] Int. Cl.² ............................................ A47C 1/025
[52] U.S. Cl. ...................................... 297/367; 297/379
[58] Field of Search ................................ 297/366–369, 297/373, 355, 379; 16/139, 145, 146

[56] References Cited

U.S. PATENT DOCUMENTS

| | | | |
|---|---|---|---|
| 2,784,770 | 3/1957 | Herr | 297/367 |
| 2,828,806 | 4/1958 | Saffer | 297/379 |
| 3,901,100 | 8/1975 | Iida et al. | 297/367 X |
| 3,902,757 | 9/1975 | Yoshimura | 297/367 |
| 3,966,253 | 6/1976 | Berghof et al. | 297/367 |

FOREIGN PATENT DOCUMENTS

| | | | |
|---|---|---|---|
| 2446181 | 5/1976 | Fed. Rep. of Germany | 297/366 |
| 1342371 | 1/1974 | United Kingdom | 297/366 |

*Primary Examiner*—Roy D. Frazier
*Assistant Examiner*—William E. Lyddane

*Attorney, Agent, or Firm*—Stevens, Davis, Miller & Mosher

[57] ABSTRACT

A reclining device for a seat comprises a first plate fixed to a seat portion, a second plate fixed to a back rest and pivoted to the first plate to permit forward and rearward reclining movements of the back rest, a toothed member secured to the second plate, and a pawl member pivoted to the first plate and movable between a locked position in which the pawl member engages the toothed member and an unlocked position in which the pawl member disengages from the toothed member. The reclining device further includes a hand lever pivoted to the first plate and operatively connected with the pawl member to move the pawl member toward the unlocked position, a cam element integrally provided with the hand lever and engageable with the bottom face of the pawl member to hold the pawl member in the locked position, a foot lever pivoted to the first plate coaxially with the pawl member and interlocked with the hand lever, and a spring biasing the hand lever toward a released position to engage the cam element with the pawl member. In the assembly, the pawl member and the cam element are arranged in a common vertical plane with the toothed member and the hand and foot levers are arranged in a common vertical plane with the second plate, thereby to reduce the width of the reclining device.

7 Claims, 4 Drawing Figures

ADJUSTING DEVICE FOR RECLINING SEAT

BACKGROUND OF THE INVENTION

The present invention relates to reclining seats for automotive vehicles, and more particularly to an adjusting device for the reclining seat which can be operated either at the front seat or at the rear seat.

SUMMARY OF THE INVENTION

The primary object of the present invention is to provide an improved reclining device, the whole component parts of which are compactly assembled widthwise to facilitate the installation of the device in a narrow space at one side of the vehicle seat, without reducing mechanical strength against a heavy impact load exerted to the back rest of the seat.

In a preferred embodiment of the present invention, the above-mentioned object is accomplished by providing a reclining device for adjusting the relative angular position of a back rest with respect to a seat portion, which comprises a stationary hinge plate fixed to one side of the seat portion in a vertical plane, a movable hinge plate fixed to one side of the back rest and pivoted to the stationary hinge plate to permit forward and rearward reclining movements of the back rest, a toothed segment secured to the movable hinge plate and located between the stationary and movable hinge plates, a pawl member pivoted to the stationary hinge plate and movable between a locked position in which the pawl member engages the toothed segment to lock the back rest in a desired reclining position and an unlocked position in which the pawl member disengages from the toothed member to permit free movement for adjustment of the back rest, a hand lever pivoted to the stationary hinge plate to be moved in a common vertical plane with the movable hinge plate and operatively connected with the pawl member to move the pawl member toward the unlocked position, a cam element integrally provided with the hand lever and engageable with the bottom face of the pawl member to hold the pawl member in the locked position when the hand lever is released, a foot lever pivoted to the stationary hinge plate coaxially with the pawl member and movable in a common vertical plane with the hand lever, a link member connecting a first arm extended downwardly from the hand lever with a second arm extended downwardly from the foot lever, and resilient means for biasing the hand lever toward the released position to engage the cam element with the pawl member. When the hand lever and the foot lever are released, the pawl member is held in the locked position by the cam element engaged therewith due to biasing of the resilient means and when the hand lever or the foot lever is operated against biasing of the resilient means, the cam element disengages from the pawl member, which is simultaneously moved from the locked position to the unlocked position.

BRIED DESCRIPTION OF THE DRAWINGS

Other objects and advantages of the present invention will become apparent from the following detailed description, reference being made to the accompanying drawings in which.

DESCRIPTION OF THE PREFERRED EMBODIMENTS

Figure 1:
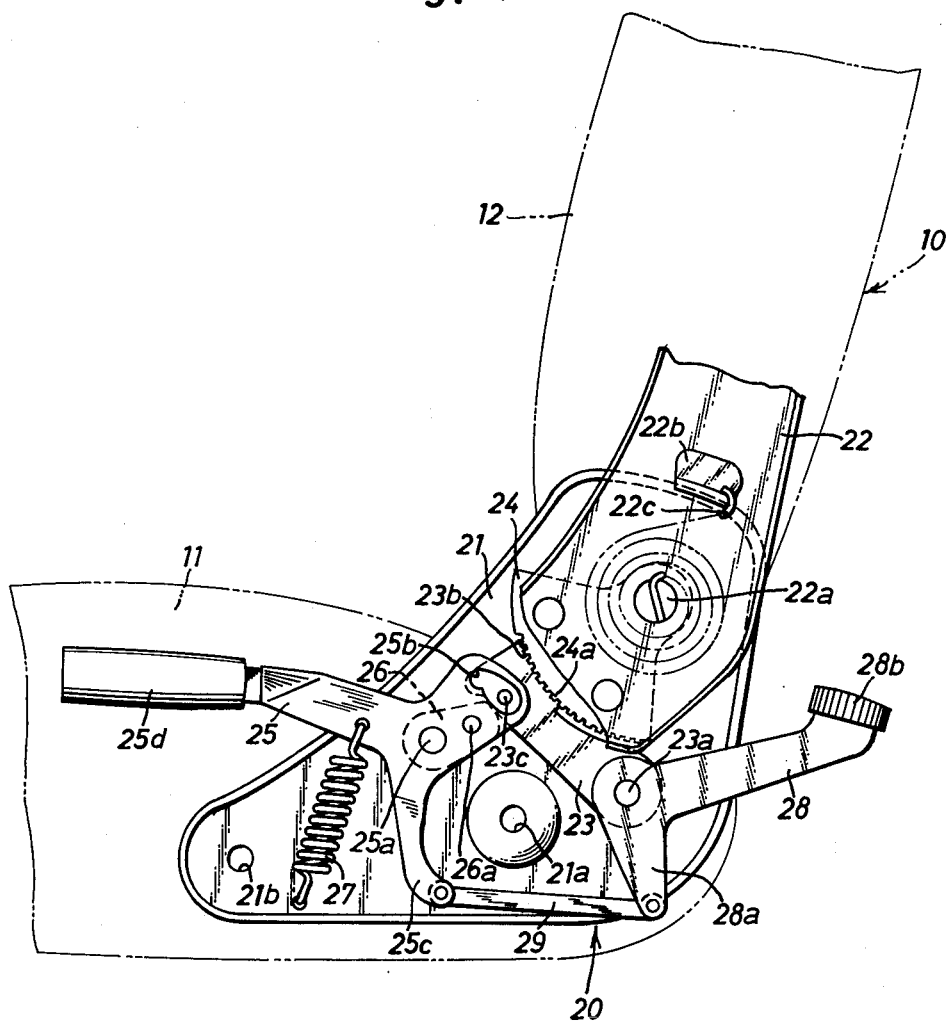
FIGS. 1 and 2 illustrate a reclining device in accordance with the present invention equipped to a front passenger seat of an automobile, FIG. 1 showing a locked position of the reclining device and FIG. 2 showing an unlocked position of the same.

Referring now to the drawings, particularly in FIG. 1 there is illustrated a preferred embodiment of a reclining device 20 in accordance with the present invention which is equipped with a front passenger seat 10 of an automobile. In the reclining device 20, a stationary hinge plate 21 is vertically fixed to a rear portion of one side of a seat cushion 11 by means of fastening bolts (not shown) inserted into mounting holes 21a and 21b at the center and front end of the stationary plate 21. A movable hinge plate 22 is fixed to one side of a back rest 12 and is pivoted by a pin 22a to the upper portion of the stationary hinge plate 21 so that the back rest 12 can be reclined either to forward or backward. To lock the back rest 12 in a desired angular position, there is provided a pawl member 23 pivoted by a pin 23a to the stationary hinge plate 21, the teeth 23b of which engages with the teeth 24a of the toothed member 24 secured inside at lower portion of the movable hinge plate 22. Moreover, the movable hinge plate 22 is biased forwardly by means of a spiral spring 22c, one end of which is fastened to the pivot pin 22a and the other to a lateral lug 22b of the movable plate 22.

Figure 3:
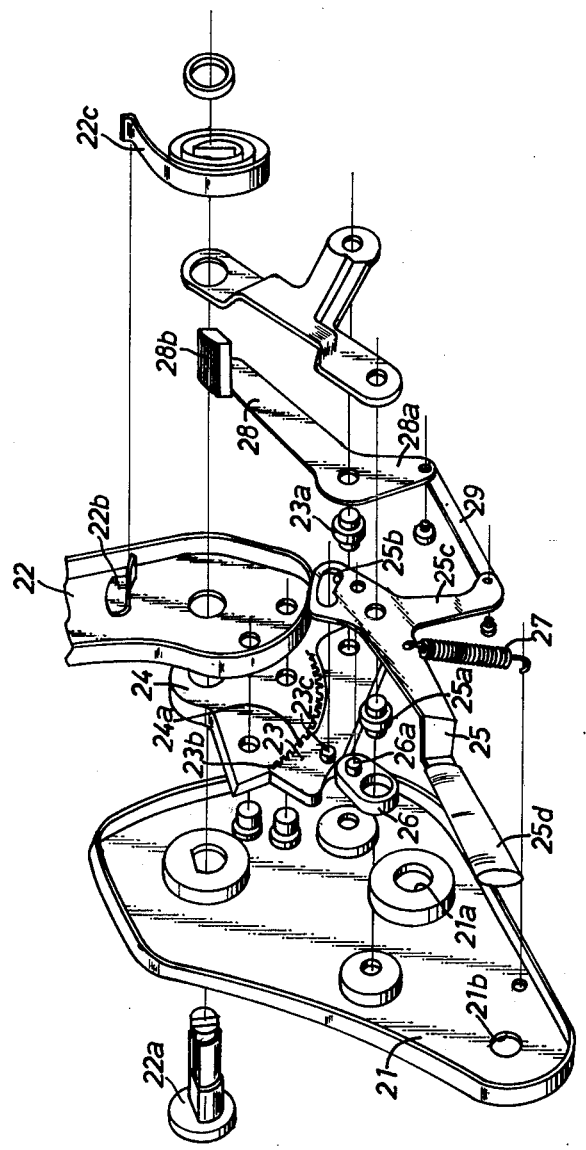
FIG. 3 illustrates the disassembled component parts of the reclining device.

To release meshing engagement of the pawl member 23 with the toothed member 24 at the front passenger seat 10, a hand lever 25 with a grip 25d is arranged in a common vertical plane with the movable hinge plate 22 and is pivoted by a pin 25a to the front portion of the stationary hinge plate 21 to be moved up and down. At the right end of the hand lever 25 is drilled an arc-shaped elongated hole 25b where a lateral pin 23c of the pawl member 23 is inserted so that the hand lever 25 is interlocked with the pawl member 23. Inside the hand lever 25, a cam member 26 is pivoted by the pin 25a to the stationary plate 21 coaxially with the hand lever 25 and is fixed to a portion of the hand lever 25 by means of a projection 26a extended from the cam member 26. This cam member 26 is engaged with the bottom face of the pawl member 23, as shown in FIG. 3, to maintain engagement of the pawl member 23 with the toothed member 24. The hand lever 25 is also biased in the counterclockwise direction by means of a tension spring 27, one end of which is fastened to a portion of the hand lever 25 and the other to a portion of the stationary hinge plate 21. At the back of the front passenger seat 10, there is provided a foot lever 28 with a pedal 28b in a common vertical plane with the hand lever 25 and is pivoted by the pin 23a coaxially with the pawl member 23 to move up and down. An arm 28a extended downwardly from the foot lever 28 is operatively connected to an arm 25c extended downwardly from the hand lever 25 by means of a link member 29 which is positioned behind the arms 28a and 25c.

In the assembled construction of the reclining device 20, it should be recognized that the pawl member 23 and the cam member 26 are arranged in a common vertical plane with the toothed member 24 and also the hand lever 25 and the foot lever 28 are arranged in a common vertical plane with the movable hinge plate 22, thereby to reduce the width of the reclining device 20. Further-more, the reclining device 20 is characterized in that the mounting hole 21a of the stationary hinge plate 21 is located adjacent to the pivot pin 22a for the movable hinge plate 23 to maintain the supporting strength of the movable hinge plate 22 and is exposed between the hand lever 25 and the foot lever 28 to facilitate the assembling of the stationary plate 21.

In operation of the reclining device 20, when the hand lever 25 and the foot lever 28 are released as shown in FIG. 1, the hand lever 25 is located in the downward position due to biasing of the tension spring 27, whereas the foot lever 28 is located in the upward position by means of the link member 29. Under this released condition, the cam member 26 united with the hand lever 25 is engaged at its upper surface with the bottom face of the pawl member 23 due to biasing of the tension spring 27 to push up the pawl member 23 so that the teeth 23b of the pawl member 23 are surely meshed with the teeth 24a of the toothed member 24 and the movable hinge plate 22 is firmly locked in a desired angular position.

Figure 2:
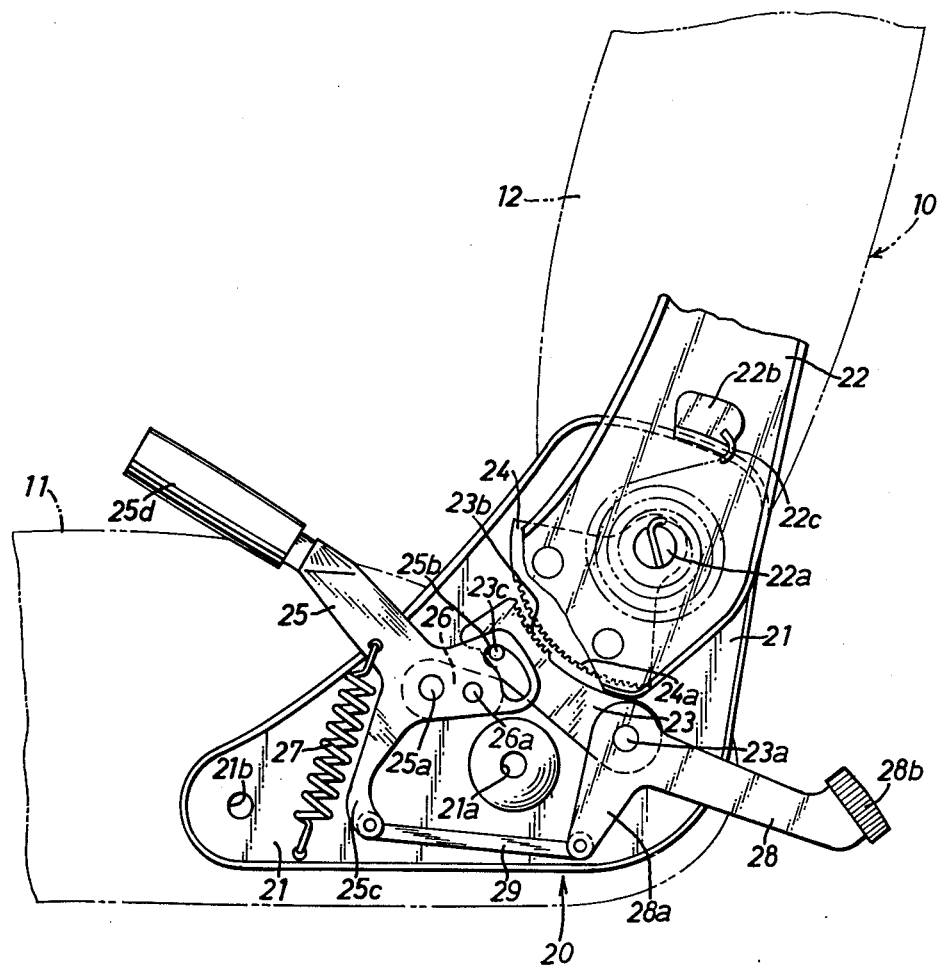

To adjust the relative angular position of the back rest 12 with respect to the seat cushion 11, the hand lever 25 is pulled up against the tension spring 27 by an operator seated on the front seat 10 or the pedal 28b of the foot lever 28 is depressed by a passenger seated on the back seat. In this instance, the cam member 26 is separated from the pawl member 23 due to clockwise rotation of the hand lever 25 as shown in FIG. 2 and simultaneously the pin 23c of the pawl member 23 is forcibly moved down due to engagement with the upper inside surface of the elongated hole 25b, resulting in disengagement of the pawl member 23 from the toothed member 24. Thus, the back rest united with the movable hinge plate 22 can be adjusted in a desired angular position. Under this condition, the clockwise rotation of the hand lever 25 is restricted due to engagement of the pin 23c with the left end of the elongated hole 25b so that the hand grip 25b and the foot pedal 28b are held in the upward and downward positions respectively.

When the hand lever 25 or the foot lever 28 is released after adjustment of the back rest, the hand lever 25 is rotated counterclockwise due to tension of the spring 27 and the pawl member 23 is pushed up due to engagement with the cam member 26. This causes the meshing engagement of the pawl member 23 against the teeth of the toothed member 24 to lock the back rest in the adjusted angular position.

Figure 4:
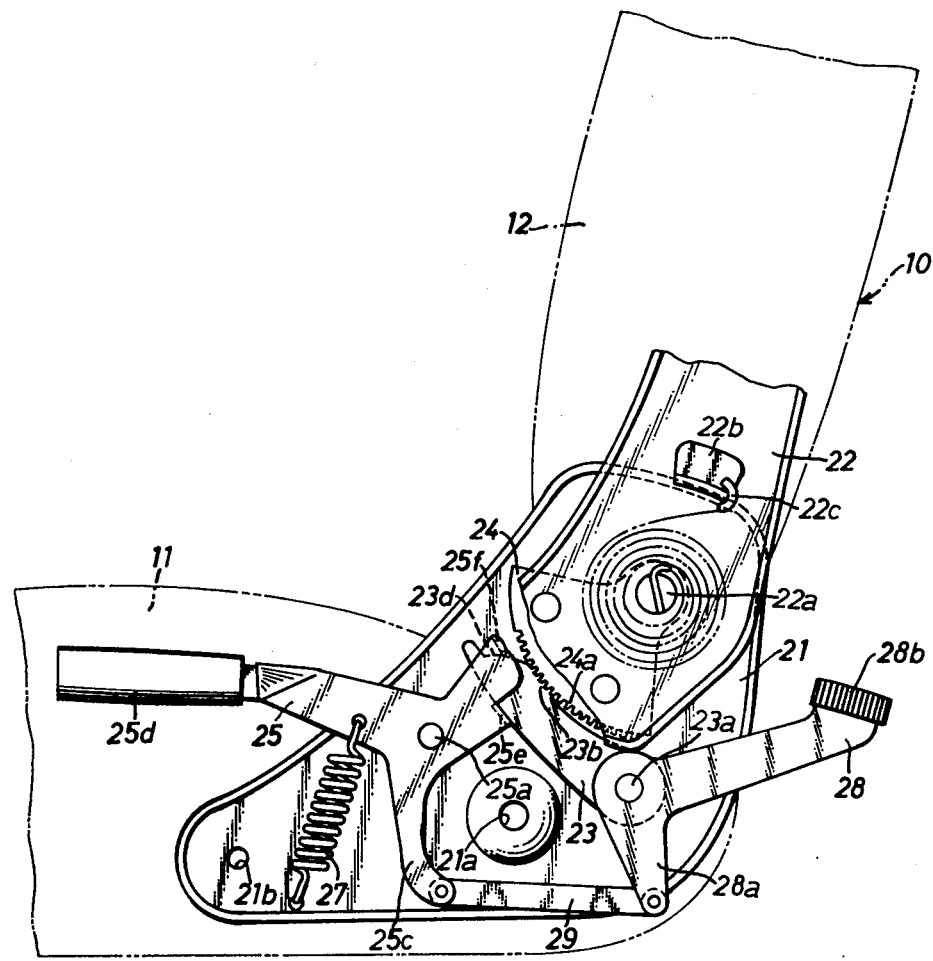
FIG. 4 illustrates a modification of the reclining device.

In FIG. 4, there is illustrated a modification of the reclining device 20, in which the hand lever 25 is provided with a first incurved tab 25e engageable with the bottom face of the pawl member 23 and is further provided with a second incurved tab 25f engageable with a recessed free end 23d of the pawl member 23. With this modification, when the hand lever 25 is released, the pawl member 23 is meshed with the teeth of the toothed member 24 due to engagement with the first tab 25e of the hand lever 25 under loading of the spring 27 to lock the movable hinge plate 22 in a desired angular position. In the case the hand lever 25 is pulled up or the foot pedal 28b is depressed, the meshing engagement of the pawl member 23 with the toothed member 24 is released due to engagement of the second tab 25f of the hand lever 25 against the recessed end 23d of the pawl member 23.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. In combination with a reclining seat having a seat portion and a movable back rest, a reclining device comprising:

a stationary hinge plate fixed to one side of said seat portion in a substantially vertical plane;

a movable hinge plate fixed to one side of said back rest and pivoted to said stationary hinge plate to permit forward and rearward reclining movements of said back rest;

a toothed member secured to said movable hinge plate and located between said stationary and movable plates;

a pawl member pivoted to said stationary plate in a common substantially vertical plane with said toothed member and movable between a locked position in which said pawl member is engaged with said toothed member to lock said back rest in a reclining position and an unlocked position in which said pawl member is disengaged from said toothed member to permit free movement for adjustment of said back rest;

a hand lever pivoted to said stationary hinge plate in a substantially vertical common plane with said movable hinge plate and being operatively connected with said pawl member, said hand lever having a first downwardly extending arm;

a cam element on said hand lever in a common substantially vertical plane with said pawl member and engageable with a bottom face of said pawl member to hold said pawl member in the locked position when said hand lever is released;

resilient means for biasing said hand lever to engage said cam element with said pawl member;

a foot lever pivoted to said stationary hinge plate coaxially with said pawl member and arranged to be moved in a substantially vertical common plane with said hand lever, said foot lever having a second downwardly extending arm; and a link member connecting said first arm with said second arm so that the hand lever and the foot lever move in unison whereby when said hand lever or said foot lever is operated against the bias of said resilient means, said cam element is disengaged from said pawl member and said pawl member moves from the locked position to the unlocked position.

2. The combination as set forth in claim 1, wherein said cam element is pivoted to said stationary hinge plate coaxially with said hand lever and secured to a portion of said hand lever to be pivoted therewith.

3. The combination as set forth in claim 2, wherein said pawl member is provided at the free end thereof with a lateral pin and said hand lever is provided thereon with an elongated hole to receive said lateral pin therein, whereby when said hand lever is operated against the biasing of said resilient means, said pawl member is moved to the unlocked position from the locked position by engagement of said lateral pin against the inside surface of said elongated hole.

4. The combination as set forth in claim 1, wherein said hand lever has an incurved tab thereon engageable with a recessed free end of said pawl member to move said pawl member to the unlocked position from the locked position.

5. The combination as set forth in claim 4, wherein said cam element comprises an incurved tab on said hand lever, said incurved tab being engageable with the bottom face of said pawl member to hold said pawl member in the locked position.

6. The combination as set forth in claim 1, wherein said stationary hinge plate has a central mounting hole therein which is exposed in a space surrounded by said hand lever, said pawl member, said link member and said foot lever.

7. The combination as set forth in claim 6, wherein said movable hinge plate is pivotable about a pivot axis, and said mounting hole is adjacent the pivot axis for said movable hinge plate.

* * * * *